United States Patent [19]
McDonald

[11] Patent Number: 5,360,655
[45] Date of Patent: Nov. 1, 1994

[54] FOLDED SHEET ARTICLES

[76] Inventor: George W. McDonald, Mon Cachet, Rue de la Cache, Castel, Guernsey, Channel Islands, Channel Islands

[21] Appl. No.: 17,842

[22] Filed: Feb. 16, 1993

[51] Int. Cl.$^5$ .......................... B32B 3/08; B32B 3/04
[52] U.S. Cl. ........................................ 428/121; 281/2; 281/5; 281/31; 283/34; 283/106; 428/130
[58] Field of Search ................. 428/99, 100, 121, 130; 283/34, 106; 281/2, 5, 31

[56] References Cited

U.S. PATENT DOCUMENTS

| | | | |
|---|---|---|---|
| 1,023,834 | 4/1912 | Gareis | 281/31 |
| 1,306,691 | 6/1919 | Goetz | 281/5 |
| 1,574,838 | 3/1926 | Moore | 229/68 R |
| 1,687,304 | 10/1928 | Morris | 281/5 |
| 2,118,964 | 5/1938 | Bonnaire | 281/5 |
| 2,354,066 | 7/1944 | Sass | 229/92.1 |
| 2,422,235 | 6/1947 | Greene | 281/31 |
| 2,708,068 | 5/1955 | Guttman | 229/92.8 |
| 3,894,684 | 7/1975 | Florey | 229/92.8 |
| 4,262,939 | 4/1981 | Schoettle, Jr. | 283/65 |
| 4,477,254 | 10/1984 | Yokayama | 434/153 |
| 4,595,309 | 6/1986 | Chinchar | 402/80 R |
| 4,606,553 | 8/1986 | Nickerson | 281/5 |
| 4,838,580 | 6/1989 | Tuhkanen | 283/54 |
| 5,156,898 | 10/1992 | McDonald | 428/100 |

FOREIGN PATENT DOCUMENTS

| | | |
|---|---|---|
| 087987 | 7/1983 | European Pat. Off. |
| 157484 | 10/1985 | European Pat. Off. |
| 256672 | 2/1988 | European Pat. Off. |
| 2168637 | 8/1973 | France . |
| 190968 | 11/1907 | Germany . |
| 835219 | 10/1949 | Germany . |
| 2519627 | 11/1976 | Germany . |
| 9016738 | 3/1991 | Germany . |
| 425788 | 3/1935 | United Kingdom . |
| 563545 | 8/1944 | United Kingdom . |
| 619023 | 3/1949 | United Kingdom . |
| 660804 | 11/1951 | United Kingdom . |
| 687073 | 2/1953 | United Kingdom . |
| 2192587 | 1/1988 | United Kingdom . |
| 2204534 | 11/1988 | United Kingdom . |
| 8704284 | 7/1977 | WIPO . |
| 8911140 | 11/1989 | WIPO . |

OTHER PUBLICATIONS

Argos Store Catalog, Aug. 3, 1987, pp. 3 and 95.

Primary Examiner—Ellis P. Robinson
Assistant Examiner—Nasser Ahmad
Attorney, Agent, or Firm—McAuley Fisher Nissen Goldberg & Kiel

[57] ABSTRACT

A folded sheet article (20) comprises a sheet (22) of material having mutually transverse sets of concertina folds (24, 26) and two diagonally opposite stiff portions (28, 30) at respective corner segments (32, 34) of the sheet (as disclosed in the inventor's prior U.S. Pat. No. 5,156,898) and has a pocket (40) at at least one of the segments (32, 34). Pocket (40) may be formed separately, may comprise the stiff portion (28), which may be folded back onto itself to form the pocket (40), or may (alone or together with said portion (28)) be formed from the sheet (22). The stiffening may be provided by a removable card (58) in pocket 40). Such card (58) may bear coded information (60) related to information (62) borne by sheet (22). Pocket (40) may have an egress retarder (64) to retard egress of a card (58). Sheet (22) may have pockets (40, 41) on either side, or pocket (40) may have sheets (22, 23) (with stiffening (30, 31)) on either side and then be provided with a differential gripper or holder (66) along the edges to enable opening selectively of the sheets (22 or 23). In a particular method of manufacture, sheet material (70) is glued at the sides on both faces and at one end with glue strips (72 to 80), then folded over stiff portion (28) to form pocket (40), and this is then placed onto the sheet (22) to attach thereto.

18 Claims, 1 Drawing Sheet

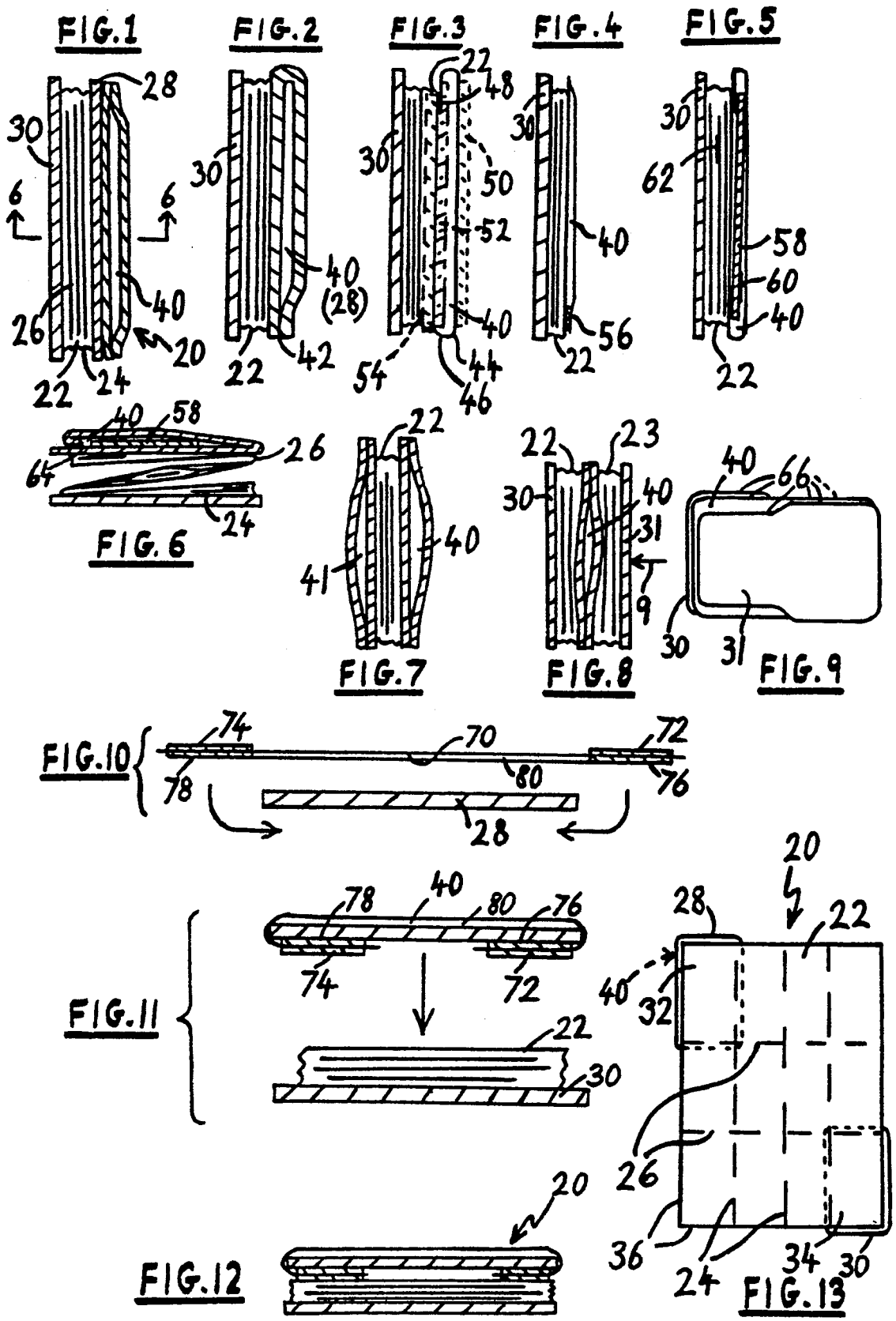

FOLDED SHEET ARTICLES

BACKGROUND

This invention relates to folded sheet articles of the kinds disclosed in my granted U.S. Pat. No. 5,156,898, the disclosure of which is hereby imported into the present specification. References herein to a "sheet" that is foldable (other than the belowmentioned sheet material folded over in forming a pocket), refer to a sheet having folds, being unfoldable at such folds and being folded up or not. This accords with the definition given at the beginning of the specification of that patent, according to which the "sheet" was defined as being of a material which has folds in it, regardless of whether it is in a folded up condition or not unless the context otherwise requires, and further is a material that takes folds at which it can be easily unfolded (without the folds disappearing) and refolded. It may be paper, or a paper-like material such as plastics sheet on which books are commonly printed, or may be very thin card or any other suitable flexible material. It is conceivable that the sheet material may be stiff except at the folds, e.g. very thin card inter-connected by paper or cloth, but this is deprecated as not allowing full realisation of the advantages of the invention.

One of the objects of that invention was to provide a large quantity of information in compact form by using a doubly-folded sheet and making this particularly convenient by providing means (the stiff portions) to enable ready access to that information by simple and easy opening of the sheet. Upon introduction of this prior invention, it was an instant success and large quantities have been sold.

One other object of the prior invention was to produce an article like a credit card, having only slightly greater thickness than a credit card and fitting easily with other credit cards into a credit card wallet.

Sometimes this produced an inconveniently thick wallet of credit cards.

THE INVENTION

After some years with this problem, the present inventor conceived the possibility of turning the original idea inside out and, instead of making the folded sheet a credit card to go with other credit cards into a wallet, has designed the folded sheet so that it shall itself act as a wallet and contain the other credit card or cards.

Accordingly, the invention consists of a folded sheet article as claimed in claim 1.

The pocket may be formed by several different methods according to manufacturing capability. In one method, said pocket is formed separately from said one segment (and maybe separately from the stiff portion thereat) and attached thereto, which method is particularly adapted to make use of existing machinery used in the course of manufacturing the folded sheet articles of the prior invention and machinery for producing pockets and goes on to attach these together e.g. by plastics welding. In another method, said pocket itself comprises said stiff portion at said one segment, e.g. the pocket being formed in known manner and then attached to the sheet material to constitute said stiff portion at said one segment. In yet another method, said stiff portion at said one segment is formed of material folded back onto itself to form said pocket, e.g. by plastics welding along two edges adjacent to the fold. Yet again, said pocket can be formed from said sheet itself such as by folding an extended portion of the sheet back on itself and fastening along two edges of which at least one is adjacent the fold. In the latter case, the pocket may itself be stiff enough to constitute the stiff portion or, alternatively, a stiff portion could be attached on the outside of the pocket (the face opposite that to which the sheet folds) or by multiple folding could be attached to the inside of the pocket or could even be attached to the sheet at the inner side of the pocket.

As a particularly important object of the prior invention was ease and convenience of opening the folded sheet, the stiff portion at the other of said segments can be made slightly larger than the folded sheet intervening between the stiff portions, and the stiff portion at said one segment can then be made sufficiently massive to allow single-handed folding and opening of the sheet by holding the sheet by the other stiff portion and projecting said sufficiently massive stiff portion away therefrom.

Alternatively, the stiff portion at the pocket may not itself be sufficiently massive for this but the pocket can be provided with at least one removable card which make/s the stiff portion sufficiently massive to allow single-handed holding and opening of the sheet.

Yet another alternative is to make the stiff portion at the pocket side of the article stiff enough (by itself or by means of a contained removable card) to be held and the stiff portion at the other side of the article sufficiently massive to allow single-handed holding and opening of the sheet by holding the article by the pocket stiff portion and projecting the opposite stiff portion away therefrom. This has the great advantage that articles held insufficiently firmly in the pocket will then not fall out upon such projective opening.

The invention may alternatively be considered as a credit card wallet with a large amount of information permanently attached thereto by means of a doubly concertina-folded sheet and, in a commercially viable embodiment having this object, the pocket is provided with at least one removable card which is of "credit card" size being about 5 to $5\frac{1}{2}$ cm width by about 8 to $8\frac{1}{2}$ cm length and the whole article is slightly larger than this so that the card/s fit/s snugly and easily into the pocket.

While the foregoing embodiments have indicated only a mechanical relationship between the card, where this is provided, and the remainder of the folded sheet article, a particularly useful embodiment is obtained by providing the pocket with at least one removable card bearing coded information relating to information borne by the sheet. For example, the card might be a telephone card (e.g. having magnetically-coded charging information) and the sheet might have a complete list of telephone area codes. Again, the sheet might contain information adapted for a more intimate interaction with coded material on the card.

In a direction to provide even more capacity for cards, the sheet may have a pocket formed at each of said opposite segments. Alternatively, in a direction towards increasing the amount of information accompanying the card/s, there may be provided two of said folded sheet articles interconnected by a common said pocket. Opening of the said article could be facilitated by differential holding means at the edges so that the pocket and rear folded sheet are retained easily and simply when the stiff portion of the front folded sheet is projected out to open that sheet.

In a particularly useful manufacturing technique, said pocket comprises said stiff portion at said one segment and the pocket is formed by sheet material folded over two opposite sides of the stiff portion at said one segment and attached to the back of this portion, preferably with the stiff portion, said sheet and said sheet material made separate from each other. In the method, the sheet material is folded over the two opposite sides of the stiff portion and attached to the back of this portion to form the pocket and this is attached to said sheet. This is preferably effected by the sheet material being provided with adhesive (e.g. glued) at the sides on both faces and at one end, then folded over the relevant stiff portion to form the pocket, and this being then placed to said sheet to attach thereto. This method has advantages of cheapness and ease of manufacture, particularly if all of the gluing is done at a single stage before any folding or attaching of the sheet material.

BRIEF DESCRIPTION OF THE DRAWINGS

Reference will now be made by way of example to the accompanying drawings, in which:

FIGS. 1 to 5, 7 and 8 are diagrammatic cross-sectional end views of articles embodying the invention;

FIG. 6 is a diagrammatic cross-sectional side view of the article shown in FIG. 1, taken along the line 6—6;

FIG. 9 is a diagrammatic, slightly perspective, plan view of the FIG. 8 embodiment looking in the direction of arrow 9, on a reduced scale;

FIGS. 10, 11 and 12 are diagrammatic cross-sectional end views of successive stages in the manufacture of a variation of the FIG. 2 embodiment; and FIG. 13 is a diagrammatic plan view of an article embodying the invention with said sheet opened out.

DETAILED DESCRIPTION

Referring to the drawings, and more particularly FIGS. 1 and 13, a folded sheet article 20 comprises a sheet 22 of material as hereinbefore defined having a first set of concertina folds 24 and, so as to be transverse to these when the sheet 22 is folded with these folds 24, a second set of concertina folds 26, the sheet 22 being provided with two diagonally opposite, defined, stiff portions 28, 30 at segments 32, 34 of the sheet 22, which segments are at or near diagonally opposite corners of the sheet 22 and defined by fold/s and/or edge/s 24, 26, 36 thereof, the article 20 comprising a pocket 40 formed at said segment 32. The manner of operation of the article and the advantages of it (apart from its pocket) are discussed in prior British Patent Specification 2173448B. Said pocket 40 is formed separately and attached to stiff portion 28, which is itself attached to sheet 22, the attachments being by plastics welding and/or gluing.

As shown in FIG. 2, the pocket 40 is formed separately and then attached directly to sheet 22 by gluing so as to serve itself as a stiff portion 28 at said segment 32. As particularly shown in FIG. 2, the stiff portion 28 is formed of material folded back onto itself to form said pocket by plastics welding at seam 42 and at the remote edge from the direction of view of FIG. 2. Alternatively, the fold could be at the remote edge, one seam 42 as shown and the other seam at the edge opposite to 42 (the top as seen in FIG. 2).

As shown in FIG. 3, said pocket 40 can be formed from said sheet 22 itself, by folding an extended portion 44 of the sheet back on itself at edge 46 and fastening it, e.g. by gluing along the remote edge (not seen) and the edge 48. The pocket may itself be stiff enough to constitute the said stiff portion, or a stiff portion 50 may be attached on the outside of pocket 40 or, by multiple folding as shown, a stiff portion 52 may be attached to the inside of the pocket, or a stiff portion 54 may be attached to the sheet 22 at the inner side of pocket 40.

As shown in FIG. 1, the stiff poriton 30 at segment 34 is slightly larger than the folded sheet intervening between the stiff portions 28, 30, and the stiff portion 28 at said one portion 32 is sufficiently massive to allow single-handed folding and opening of the sheet by holding the sheet by the stiff portion 30 an projecting said portion 28 away therefrom, so that the sheet opens in the manner described in the said United States Patent.

Alternatively, as shown in FIG. 4, said pocket 40 is formed only from said sheet 22, adhered (e.g. glued) at 56. If this pocket 40 is not sufficiently massive itself for the aforesaid purpose, it may, as shown in FIG. 5, be provided with a removable card 58 which makes the pocket 40 sufficiently massive for the aforesaid purpose and may also make the pocket sufficiently stiff for the purpose of grasping it to open the article as described in the said United States Patent.

Yet another alternative is to make the pocket 40 side of the article stiff enough to grasp and the stiff portion 30 massive enough for the single-handed holding and opening aforementioned.

In the embodiments illustrated in all of the drawings, the pocket 40 fits snugly and easily at least one removable card 58 which is of "credit card" size, being about 5 to 5½ cm width by about 8 to 8½ cm length and the article 20 is therefore slightly larger than this. As indicated diagrammatically in FIG. 5, the removable card 58 may bear coded information 60 relating to information 62 borne by the sheet 22.

FIG. 6 shows how the pocket 40 of any of the embodiments may be provided with means 64 to retard egress of a card 58 therefrom but allow deliberate withdrawal of the card. Means 64 may simply comprise a folded back edge of the pocket 40, and may be left loose or adhered (e.g. glued) or welded into position.

FIG. 7 shows an embodiment in which there is a pocket 40, 41 at each of said opposite segments 32, 34 respectively. FIG. 8 shows an embodiment in which a pocket 40 serves as one of said stiff portions for each of two sheets 22, 23 on opposite sides of pocket 40, each of these sheets having its own other stiff portion 30, 31 respectively. To facilitate opening of this article as aforesaid, differential holding means 66 can be provided in the form of differently cut out edges of the stiff portions 30, 31, which will enable sheet 22 or 23 to be opened selectively, see FIG. 9.

Referring to FIG. 10, sheet material 70 is coated with strips 72, 74, 76, 78 (perpendicular to the plane of the drawing) at its sides on both faces of material 70 and with a transverse strip 80 at the remote end of material 70 as seen in FIG. 10, all these strips being of adhesive (e.g. glue), then folded over stiff portion 28 to be attached thereto by strips 76, 78, as seen in FIG. 11 to form a pocket 40. This is then lowered onto sheet 22 already adhered to stiff portion 30 to attach to sheet 22 by means of strips 72, 74 to produce the article 20 as shown in FIG. 12.

Many variations of the invention and embodiments hereinbefore described will be apparent to people skilled in the art and all such variations are to be considered as falling within the appended claims. Features from different embodiments described herein may be combined.

Another inventive feature is the use of two double concertina folded sheets 22, 23 back to back, regardless of whether there is a pocket 40 between them or simply a stiffening portion 30 replacing pocket 40, see FIG. 9. Other modifications of the embodiments of FIGS. 7 and 8 and the embodiment just described without a pocket 40 may be made having any required combination of sheet/s 22 and/or stiff portions 30 and/or pockets 40, with or without any features of any one or more of the other embodiments described.

I claim:

1. A folded sheet article comprising a sheet of material having a first set of concertina folds and, so as to be transverse to these when the sheet is folded with these folds, a second set of concertina folds, the sheet being unfoldable at such folds when folded up, the sheet being provided with two diagonally opposite, defined, stiff portions at segments of the sheet, which segments are at or near diagonally opposite corners of the sheet and defined by at least one fold or at least one edge or both thereof, characterised in that the article has a pocket formed at at least one of said segments.

2. An article as claimed in claim 1, characterised in that said pocket is formed separately from said one segment and attached thereto.

3. An article as claimed in claim 1, characterised in that said pocket comprises said stiff portion at said one segment.

4. An article as claimed in claim 1, characterised in that said stiff portion at said one segment is formed of material folded back onto itself to form said pocket.

5. An article as claimed in claim 1, characterised in that said pocket is formed from said sheet.

6. An article as claimed in claim 1, characterised in that said stiff portion at said one segment and said pocket are formed from said sheet.

7. An article as claimed in claim 1, characterised in that the stiff portion at either one of the opposite segments is slightly larger than the folded sheet intervening between the stiff portions and the stiff portion at the other of these segments is sufficiently massive to allow single-handed holding and opening of the sheet by holding the article by said larger stiff portion and projecting said sufficiently massive stiff portion away therefrom.

8. An article as claimed in claim 1, characterised in that the pocket is provided with at least one removable card which makes or make the stiff portion at the pocket sufficiently massive to allow single handed folding and opening of the sheet.

9. An article as claimed in claim 1, characterised in that the pocket is provided with at least one removable card which is of "credit card" size being about 5 to 5½ cm width by about 8 to 8½ cm length and the article is slightly larger than this so that the card fits snugly and easily into the pocket.

10. An article as claimed in claim 1, characterised in that the pocket is provided with at least one removable card bearing coded information relating to information borne by the sheet.

11. An article as claimed in claim 1, characterised in that the pocket has means to retard accidental egress of a card therefrom but allow deliberate withdrawal of the card.

12. An article as claimed in claim 1, characterised in that the sheet has a pocket formed at each of said opposite segments.

13. An article as claimed in claim 1, characterised in that it comprises two of said sheets with a said pocket formed as aforesaid in common to both.

14. An article as claimed in claim 13, characterised in that it comprises differential holding means at its edges to facilitate selective opening of one or the other of said sheets.

15. An article as claimed in claim 3, characterised in that the pocket is formed by sheet material folded over two opposite sides of the stiff portion at said one segment and attached to the back of this portion.

16. An article as claimed in claim 15, characterised in that the stiff portion at said one segment, said sheet material and said sheet of material are made separate from each other.

17. An article as claimed in claim 16, characterized in that the sheet material is folded over two opposite sides of the stiff portion at said one segment and attached to the back of this portion to form a pocket and this is attached to said sheet.

18. An article as claimed in claim 17, characterized in that the sheet material is adhered at the sides of both faces and at one end, then folded over the relevant stiff portion to form a pocket, and this is then placed to said sheet to attach thereto.

* * * * *